UNITED STATES PATENT OFFICE.

CHARLES P. HOOVER, OF COLUMBUS, OHIO.

PROCESS OF MAKING METAL-HYDROXID SOLUTIONS.

1,238,916.  Specification of Letters Patent.  Patented Sept. 4, 1917.

No Drawing.  Application filed April 24, 1917.  Serial No. 164,263.

*To all whom it may concern:*

Be it known that I, CHARLES P. HOOVER, a citizen of the United States, residing at Columbus, in the county of Franklin and State of Ohio, have invented certain new and useful Improvements in Processes of Making Metal-Hydroxid Solutions, of which the following is a specification.

This invention relates to the production of hydroxid solutions, and comprises passing a hydroxid solution through a body of material composed essentially of an exchange silicate, such as a zeolite filter, in which the exchangeable radical is the base the hydroxid of which is desired.

More specifically, the new process involves the conversion of an alkaline earth metal hydroxid or ammonium-hydroxid solution into an alkali-metal hydroxid solution by passing the former through a sodium or potassium zeolite filter. When the filter has become sufficiently exhausted it is regenerated by passing therethrough a sodium or potassium chlorid solution.

Exchange silicates have heretofore been used principally for softening hard water, in such processes the calcium, magnesium, etc., which are replaced by sodium, have been present in solution in the form of their salts (bicarbonate, sulfate, etc.) and in a state of extreme dilution. I have discovered that an exchange silicate such as zeolite may be subjected to the action of a comparatively concentrated hydroxid solution without being injuriously affected, the original hydroxid being converted into the hydroxid of the loosely bound metal or base of the zeolite.

The new process may be illustrated by the following examples:—

Example I: Clear saturated lime water (a concentrated calcium hydroxid solution) is filtered through a bed of natural or artificial sodium zeolite. The resulting effluent is a substantially pure sodium hydroxid solution, the calcium replacing the sodium in the zeolite. When the exchange of sodium for calcium has reached the economic limit, the filtration is stopped and the zeolite is regenerated by passing through it a solution of sodium chlorid, the sodium replacing calcium and yielding a filtrate of calcium chlorid. The conversion of calcium hydroxid into sodium hydroxid may then be continued.

Example II: An ammonium hydroxid solution is passed through a sodium zeolite filter and is thereby converted into a solution of caustic soda. When the zeolite has become sufficiently impoverished in sodium, it is regenerated by washing with sodium chlorid. The filtrate in this case is ammonium chlorid which may be again readily converted into ammonium hydroxid by treating it, for instance, with milk of lime.

The caustic soda solution obtained as in either of the above examples, is especially suitable for softening water by the lime-soda process. Water softened by the latter process has not infrequently been found to be preferable to zeolite softened water, especially where the softened water is to be used for boiler feed purposes. The reason for this is that in the lime-soda process considerable proportions of the carbonates and sulfates are entirely eliminated, whereas when the hard water is filtered through sodium zeolite, the carbonates and sulfates remain in the form of their sodium salts which give to the water a so-called negative hardness, and cause objectionable foaming in the boiler.

What I claim is:—

1. The process of producing a solution of a desired hydroxid which comprises passing the solution of a different hydroxid through a body of material containing essentially an exchange silicate in which the exchangeable radical is the base the hydroxid of which is desired.

2. The process of producing an alkali-metal hydroxid solution which comprises passing the solution of a different hydroxid through a bed of alkali-metal zeolite.

3. The process of producing a caustic soda solution which comprises passing a clear calcium hydroxid solution through a sodium zeolite filter.

4. The process of producing a sodium hydroxid solution which comprises passing a different hydroxid solution through a sodium zeolite filter until the latter becomes practically inactive through loss of sodium, regenerating the exhausted zeolite by washing it with a sodium chlorid solution, and then continuing the passing of said different hydroxid solution through the regenerated sodium zeolite.

In testimony whereof I affix my signature.

CHARLES P. HOOVER.